May 26, 1959
D. G. JELATIS ET AL
2,888,154
LATERAL ROTATION DEVICE
Filed May 3, 1957
4 Sheets-Sheet 1
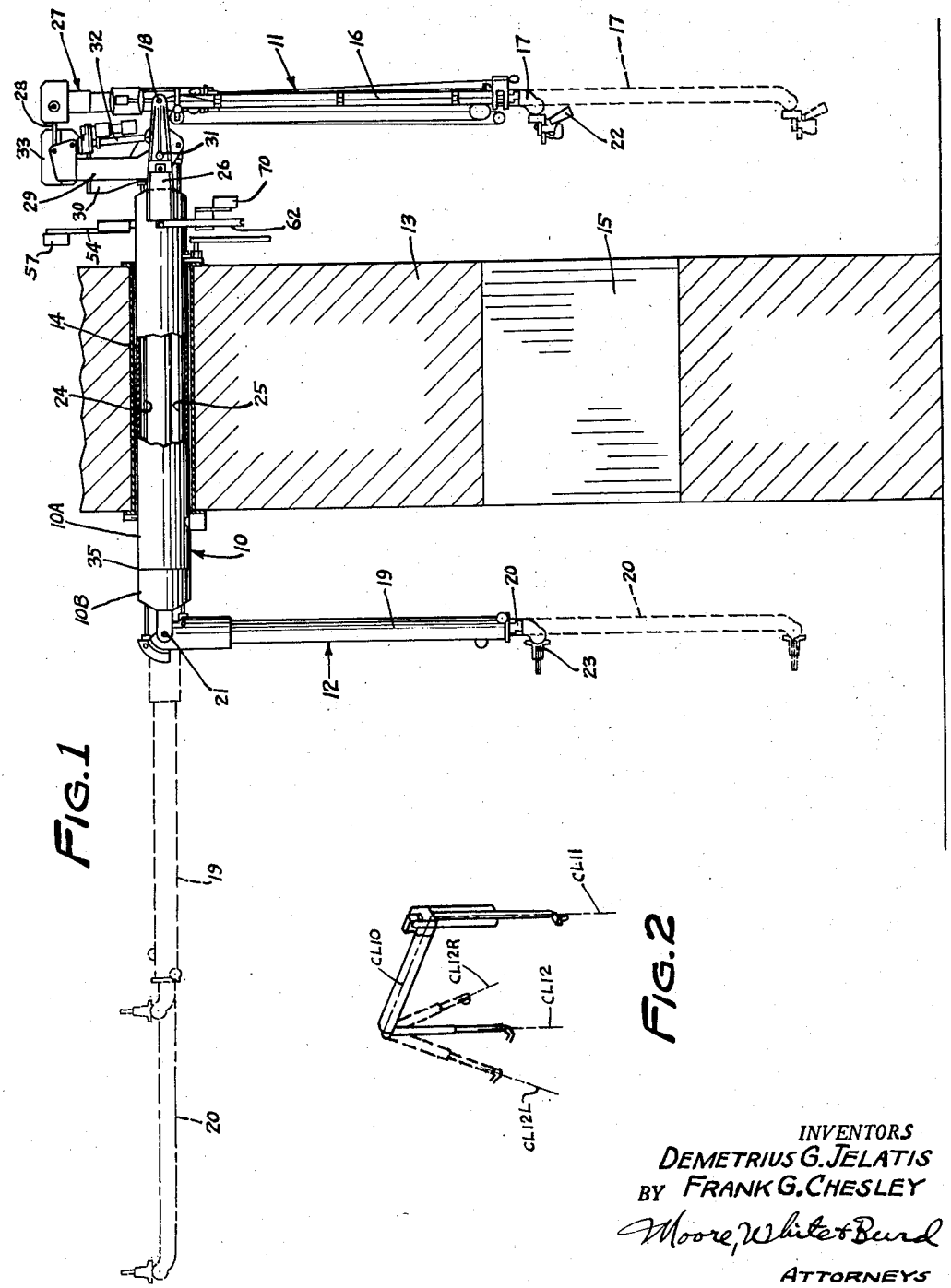
INVENTORS
DEMETRIUS G. JELATIS
BY FRANK G. CHESLEY
Moore, White & Burd
ATTORNEYS

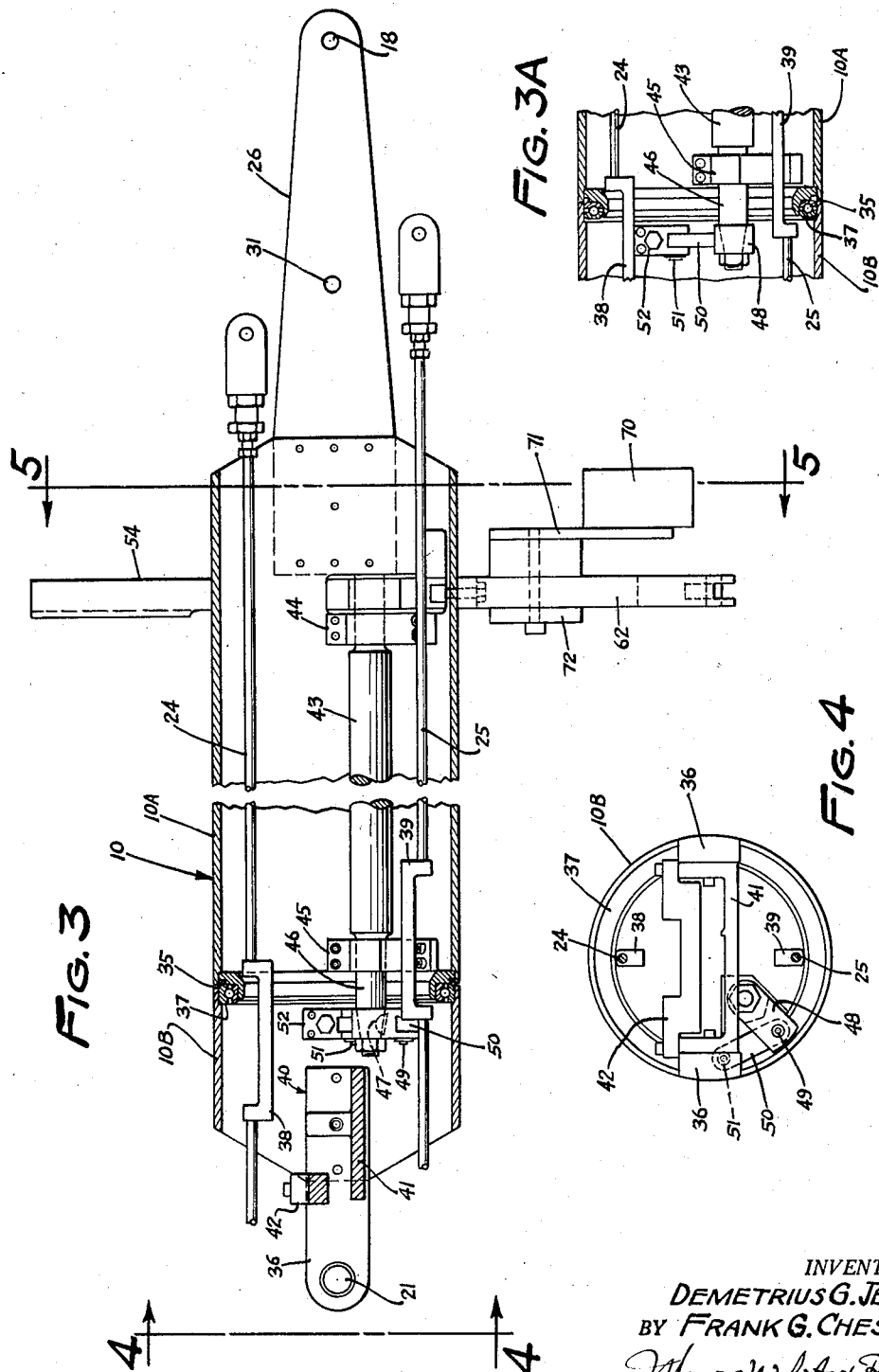

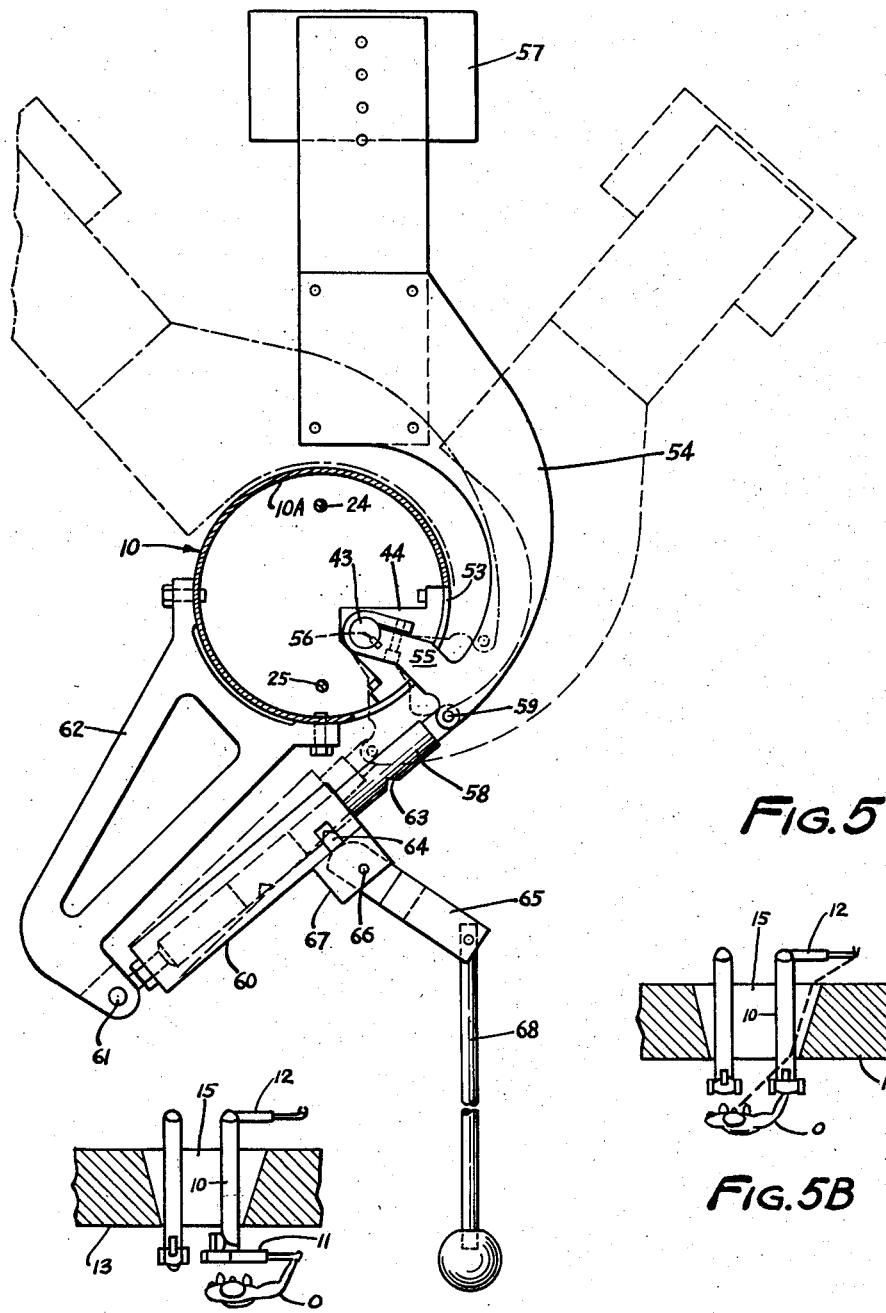

May 26, 1959
D. G. JELATIS ET AL
2,888,154
LATERAL ROTATION DEVICE
Filed May 3, 1957
4 Sheets-Sheet 4
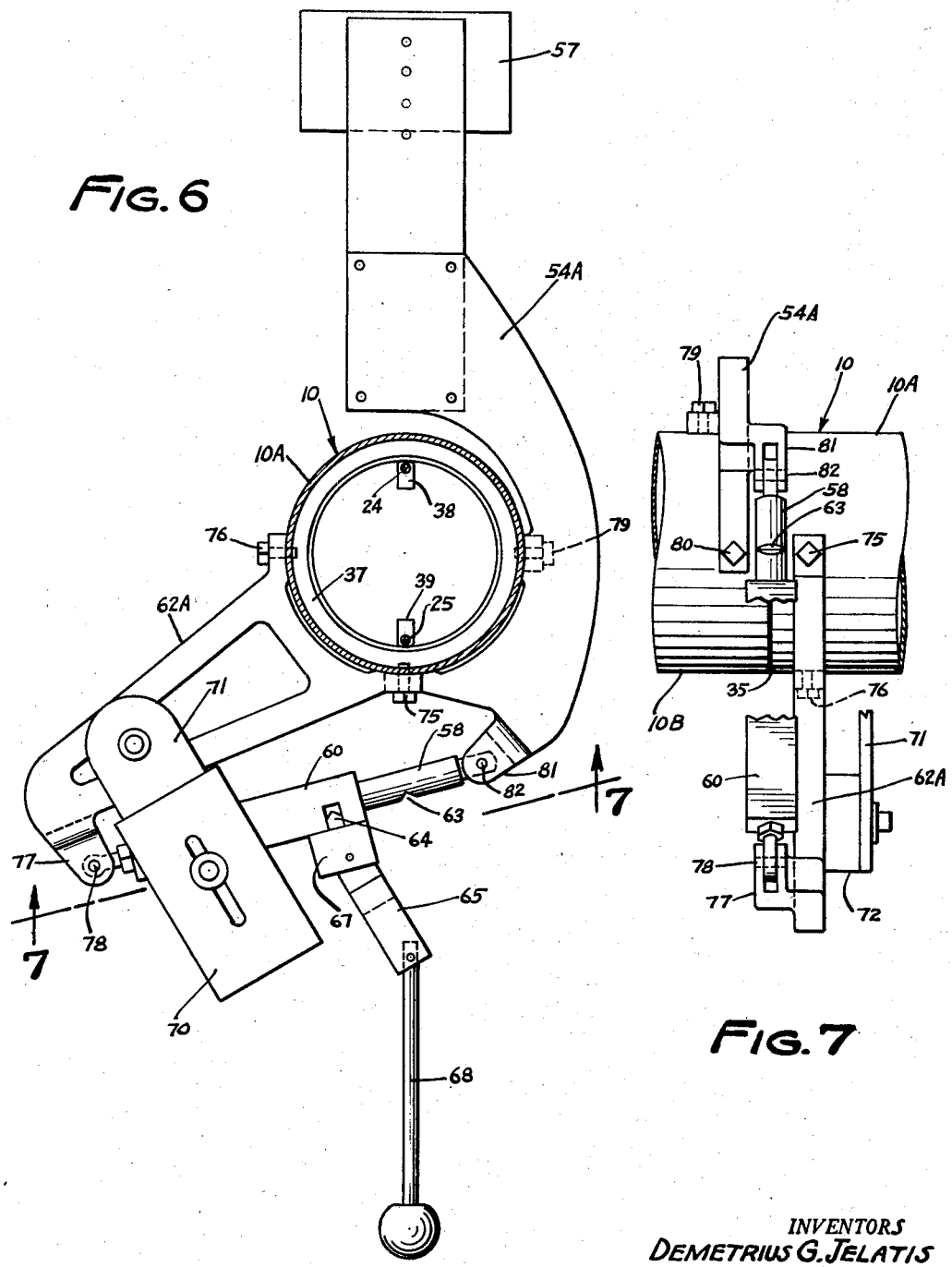
INVENTORS
DEMETRIUS G. JELATIS
BY FRANK G. CHESLEY
Moore, White & Burd
ATTORNEYS United States Patent Office 2,888,154
Patented May 26, 1959

2,888,154

LATERAL ROTATION DEVICE

Demetrius G. Jelatis and Frank G. Chesley, Red Wing, Minn., assignors to Central Research Laboratories, Inc., Red Wing, Minn.

Application May 3, 1957, Serial No. 656,919

17 Claims. (Cl. 214—1)

This invention relates to a lateral rotation device, or, more particularly, to means for introducing or providing relative rotation of the slave arm end of a remote control manipulator with respect to the master arm end. The manipulator is of the type illustrated and described in United States Patent No. 2,771,199, issued on November 20, 1956, to Demetrius G. Jelatis, one of the instant co-inventors.

The manipulator of this invention is of the type which is used by an operator to perform certain manipulative functions in some area remote from the operator as, for example, on the opposite side of a shielding wall. In most instances the manipulator is used to handle materials which might subject the operator to injury or harm if he were to handle them directly such as, for example, radio-active substances. For this reason the shielding wall is usually of substantial thickness. The manipulator has a horizontal support which extends through the shielding wall, a vertical master arm mounted on one end of the support in the safe area with the operator and a vertical slave arm suspended from the other end of the horizontal support in the area with the dangerous substance. By means of movement of a handle engaged by the operator at the master arm the slave arm of the device is caused to perform gripping and grasping manipulations.

The operator follows the operation of the slave arm of the manipulator through a suitable protective viewing window which necessarily must be of substantial thickness in order to afford adequate protection for the operator. The range of usefulness of the manipulator is limited to a large extent by the size of the window through which the operator views the slave arm end of the manipulator and the size of those windows is dictated to a large extent by the extremely high cost of thick shielding windows providing proper protection. In many instances, the operator may desire to perform manipulations to the right or left of the normal working area of the slave arm but he is unable to do so because, although he is able to maneuver the slave arms of the manipulator to these areas, he is then unable to view their operation.

The principal object of this invention, therefore, is to provide means for increasing the range of maneuverability and usefulness of a remote control manipulator of the type by which movements of a handle engaged by an operator are reproduced in a claw or grasper mechanism remote from the operator by providing means for effecting lateral travel for displacement of the remote arm with respect to that of the operator.

A further object of this invention is to provide a remote control manipulator of the type having a horizontal support extending through a shielding wall separating safe and dangerous areas having a vertical master arm mounted on the end of the horizontal support in the safe area and a vertical slave arm mounted on the end of the horizontal support in the dangerous area and having means by which the master and slave arms may be laterally displaced with respect to each other.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is an end elevation, partly in section, showing a remote control manipulator incorporating the present invention and mounted in a shielding wall;

Figure 2 is a diagrammatic representation illustrating the lateral rotation attainable by this invention;

Figure 3 is an enlarged elevation, partly in section, of the horizontal support for the manipulator;

Figure 3A is a fragmentary sectional elevation showing a portion of the slave end of the horizontal support rotated slightly relative to the master end;

Figure 4 is a vertical end view, partly in section, taken on the line 4—4 of Figure 3 and in the direction of the arrows;

Figure 5 is a vertical end view, partly in section, taken on the line 5—5 of Figure 3 and in the direction of the arrows;

Figure 5A is a top plan view of a pair of manipulator arms showing relative positions of operator, window and arms;

Figure 5B is a similar top plan view showing the beneficial effects of the lateral rotation means;

Figure 6 is a vertical end view, partly in section, of the master arm end of the manipulator and showing a modified form of the lateral rotation means; and Figure 7 is a bottom plan view of the embodiment of the lateral rotation means of Figure 6 taken generally along the line 7—7 of Figure 6 and in the direction of the arrows.

Throughout this application the manipulator is described and illustrated in terms of a single horizontal support with a single master arm and a single slave arm. It is to be understood, however, that in virtually all instances the manipulators are employed in spaced pairs so that the operator, by means of the use of two master control arms, is able to manipulate two slave arms in order to reproduce the action of a pair of hands in the remote area on the other side of the shielding wall.

Referring to the drawings and particularly to Figure 1, the remote control manipulator comprises generally a tubular horizontal support 10, a master arm 11, and a slave arm 12. The tubular horizontal support 10 extends through a generally vertical shielding wall 13, being mounted therein in a sleeve or tube 14 set in the wall. The thickness of the wall 14 and the material of which it is made depends generally upon the shielding purpose of the wall. If the wall is to shield an operator from radioactive emanation, the wall must necessarily be constructed of radiation absorbing material and be relatively thick. On the other hand, if the wall is to shield the operator from bacteria or similar noxious matter the wall may be relatively thin. In either instance the wall is provided with a window 15 of approximately the same thickness as the wall and formed, for example, of laminated glass plates.

In normal non-operating position the master arm 11 and slave arm 12 are balanced to hang generally vertical and are pivotally connected near or at their upper ends to the horizontal support 10 on opposite sides of the shielding wall 13. The master arm is in a safe area to the right of the wall 13 as viewed in Figure 1 and the slave arm is in a dangerous area to the left of the wall as viewed in Figure 1.

The master arm 11 comprises a relatively stationary part 16 and a relatively movable part 17. The stationary part 16 is pivotally connected at 18 to the horizontal support 10 and the movable part 17 is mounted on the stationary part so as to slide therealong toward and away from the pivot. Similarly, the slave arm 12 comprises a relatively stationary part 19 and a relatively movable part 20. The stationary part 19 is pivotally connected at 21 to the horizontal support 10 and the movable part 20 is mounted in the stationary part so as to be slidable therealong toward and away from pivot 21.

It should be noted that the relatively stationary parts 16 and 19 of the master and slave arms are not stationary in the strict sense of the word since they may move about their pivots 18 and 21 on the support 10. The term "stationary" is used to contrast these parts with the relatively movable parts 17 and 20, the stationary parts 16 and 19 being held against movement toward and away from the pivots 18 and 21. The movable parts 17 and 20, on the other hand, are movable toward and away from these pivots, as shown in broken lines in Figure 1.

A handle 22 on the lower end of the movable part 17 of the master arm 11 is engaged by the hand of the operator and by appropriate movement transmitted along the arm 11 through the support 10 and along the arm 12 controls the movement of a grasper or claw 23 connected to the lower end of the movable part 20 of the slave arm. It will be noted that the slave arm 12 does not project above the horizontal support 10 and thus can be moved into a horizontal alignment with the support 10 (as shown in the broken lines) when the manipulator is being installed or removed from the wall 13.

The manner by which the handle 22 is used by the operator to manipulate and control the claw or grasper 23 on the slave arm is described in detail in the Jelatis patent and in greater detail in the copending application of Goertz et al., Serial No. 501,008, filed April 12, 1955. Since that construction forms no part of the instant invention it need not be repeated here.

In the operation of the remote control manipulator the master arm 11 can be moved closer to or farther from the wall by movement on its pivot 18. When the master arm 11 is thus canted or angularly shifted about its pivot 18, the slave arm 12 will follow the master arm in similar angular motion because of the interconnection of the arms through the links 24 and 25. The pivot support 18 for the master arm 11 is between the outer end of a pair of horizontal arms 26 extending out from the master end of the horizontal tubular support 10.

The upper end of the master arm 11 carries a frame indicated generally at 27 which is connected through a link 28 to an arm 29 pivotally supported on one of the hubs of a bifurcated counterweight support 30 which is pivotally supported at 31 between the arms 26 in a manner explained in detail in the cited Jelatis patent. The upper end of the arm 29 is connected through an adjustable link 32 to the bifurcated counterweight support 30 which carries a counterweight 33. The result is that when the master arm 11 is shifted angularly about its pivot 18 that movement is imparted to the links 24 and 25 through tube 10 and the slave arm 12 is similarly shifted about its pivot 21.

Although the master arm 11 and the slave arm 12 are normally parallel to one another this is not always true and the slave arm may be angularly displaced by means of the adjustable link 32. For example, the slave arm 12 may be angularly displaced as shown in the broken lines in Figure 1 for removal of the slave arm from the dangerous area or for specific needs it may be angularly displaced to any intermediate position.

In normal operation the master arm 11 and the slave arm 12 move together laterally in the plane shown schematically in the perspective view of Figure 2. The center line CL11 of the master arm, the center line CL12 of the slave arm, and the center line CL10 of the horizontal support all lie in a plane. Even though the slave arm 12 is angularly displaced with respect to the master arm its center line still lies always in the same plane.

It is the purpose of this invention to permit lateral displacement of the slave arm 12 so that its center line will lie outside of the plane of master arm 11 and horizontal support 10 as shown, for example, at CL12R representing a displacement of the slave arm to the right of the master arm and CL12L representing a lateral displacement of the slave arm to the left of the master arm. This is accomplished in the embodiment of the invention shown in Figures 1 and 3 by breaking the horizontal support 10 as indicated at 35 adjacent to the end where slave arm 12 is mounted on the horizontal support. Thus, it is seen that in this form of the invention the horizontal support 10 is composed of a dominant master arm portion indicated at 10A mounted in the sleeve 14 set in the wall 13 and a smaller tubular portion indicated at 10B extending into the dangerous area at the slave end of the support.

The pivot support 21 for the slave arm 12 is supported between a pair of bracket arms 36 secured to the short portion 10B at the slave end of the horizontal support. A ring bearing 37 is fitted into the horizontal tubular support so that slave arm portion 10B of the horizontal support is freely rotatable with respect to the master arm portion 10A of the support. The links 24 and 25 are passed around the ring bearing 37 by means of offset connectors 38 and 39, respectively. Arms 36 are part of a yoke 40 which includes a web portion 41 which interconnects the arms 36. A bridge member 42 is disposed across the yoke between the pair of arms 36.

Rotational movement is imparted to the short slave arm portion 10B of the tubular horizontal support relative to the dominant master arm portion 10A of the support by means of a horizontal torque bar or rod 43. Torque bar 43 is journalled for rotation within the larger master arm portion 10A of the horizontal support 10. It is mounted at the master arm end of the tubular support in a bearing 44 and at the slave arm end in a bearing 45 adjacent to the ring bearing 37. Both torque rod bearings are secured to the wall of the master arm portion 10A of the tube.

The slave arm end 46 of the torque bar 43 is secured by means of a key 47 to a slotted crank arm 48 which is pivotally connected at 49 to a link 50. The opposite end of link 50 is pivotally connected at 51 to a bracket 52 secured to the side wall of the tubular horizontal support slave arm portion 10B. Thus, when the torque bar 43 is rotated in its bearings 44 and 45 in the master arm portion 10A of the tubular horizontal support member in a manner explained in detail hereinafter, the crank arm 48 keyed to the end of the torque bar transmits the rotational movement from the torque bar through link 50 to bracket 52 and the short slave arm portion 10B of the tubular support.

The rotation of the torque bar 43 is relative to the master arm portion 10A of the tubular horizontal support and through the transmission of this rotation to the short slave arm portion 10B of the tubular support that portion of the tubular support is rotated relative to the remainder of the tubular support portion. That is, the end of the tubular support carrying the slave arm 12 is rotated relative to the main part of the tubular support with the result that the slave arm has been moved laterally with respect to the master arm carried by the other end of the horizontal support.

Referring to Figure 5, tubular horizontal support 10 is provided with a slot 53 around part of its periphery at the master arm end adjacent to the master arm end of the torque bar 43. A curved counterweight arm 54 having a projecting tongue 55 is positioned relative to the horizontal support 10 so that the projecting tongue 55 extends through the slot 53. The counterweight arm is keyed by means of a Woodruff key 56 to the end of torque bar 43 adjacent to the bearing 44. Counterweight arm 54 carries a heavy counterweight 57 at its opposite extremity.

It will be readily apparent that with the tubular support remaining stationary movement of the counterweight arm 54 will impart a rotational motion to the torque bar 43 which is transmitted through crank arm 48 and link 50 to slave arm tube portion 10B whereby the tube portion 10B may be rotated relative to the tubular support portion 10A.

Movement of the counterweight arm 54 and the resultant rotation of the torque bar 43 is regulated and controlled by jack means mounted on the outside of master arm portion 10A of the tubular support and connected to the counterweight arm. The jack means includes a jack piston 58 pivotally secured at 59 to the elbow of the counterweight arm. Piston 58 telescopes in a jack housing 60 which is pivotally mounted at 61 to a supporting arm 62 secured firmly to the master arm portion 10A of the tubular support member. The jack structure shown in Figure 5 is a simple, manually operated jack and may readily be replaced with conventional mechanical, electrical, or hydraulic jacks without departing from the scope of this invention.

The piston of the manual jack shown is provided with a plurality of notches 63 each positioned to lock the piston counterweight arm, torque bar, etc. in a predetermined position so as to maintain some predetermined relationship between the master arm and the slave arm. For example, in Figure 5 the middle notch represents a neutral position and when the piston is locked in this position the center lines of both the master arm and the slave arm lie in a single plane. On the other hand, when the piston is retracted and locked by means of the uppermost or righthand notch the counterweight arm and the torque bar, etc. are rotated in a clockwise direction with the result that the slave arm 12 is displaced laterally to the left of the master arm.

Exemplary locking means, as shown in Figure 5, include a detent 64 slidably movable in an opening in the wall of the jack housing 60. The detent 64 is urged into locking position by means of an eccentric arm 65 pivoted at 66 in a bracket 67 extending outwardly from the jack housing 60. Upon upward movement of handle 68 the free end of the eccentric arm 65 is raised and the eccentric end is lowered permitting the detent 64 to drop by gravity out of locking position and the piston jack is permitted to move relative to the piston housing. Normally this is accomplished by moving the manipulator arms to such a position that the slave arm 12 is against some stationary object. Then, while the slave arm is held in a stationary position, the locking mechanism is released and the master arm is rotated laterally to the desired displaced position and locked.

The counterweight 57 which is laterally rotatable with the slave arm end of the manipulator is balanced or trimmed by means of a further heavy counterweight 70 which is adjustably secured to a counterweight arm 71 which in turn is adjustably mounted on the jack supporting arm 62 which is secured to the master arm end of the manipulator. The master arm counterweight structure is shown in Figures 1 and 3 but is omitted from Figure 5 for the sake of clarity. The structure of the master arm counterweight is shown in somewhat greater detail in Figure 6 and it will be apparent that the weight 70 may be readily adjusted to its proper balancing position.

Although in Figures 1 and 3 the manipulator is shown with the break or cut 35 in the tubular horizontal support 10 as being immediately adjacent the slave arm end of the horizontal support it will be obvious that the invention is not so limited and the break in the support 10 may, if desired, be formed at any point between the support arm 62 and the slave arm end of the support 10. It will be noted that the radius of rotation of the crank arm 48 is only about one-half the radius of rotation of the laterally rotatable slave arm end 10B of the horizontal support. The consequence of this is that the torque bar 43 must be rotated through an angle approximately twice the desired angle of lateral rotation of the slave arm. For example, by comparison of Figures 5 and 2 it will be noted that the angle of rotation of the counterweight arm 54 as shown in the broken lines is approximately twice the resultant angle of rotation through which the center line of the slave arm is moved, as indicated schematically in Figure 2.

The lateral displacement of the slave arm relative to the master arm as it effects the increased usefulness of the manipulator and ease of operation is shown by comparison of Figures 5A and 5B. In these top plan views the operator O is shown in his normal operating position before the viewing window 15 in the shielding wall 13. In Figure 5A the arms 11 and 12 of the manipulator are shown in their normal relative operating positions in which their center lines lie in a common plane.

It will be noted that the range of usefulness of the manipulator is limited largely by the size of the viewing window 15 and the length of the operator's arms. While the slave arm 12 may be extended to reach far to the right or to the left the operator cannot easily make use of the long reach of the slave arm because when he moves the master arm to the corresponding position his position relative to the window is changed and the slave arm is no longer within his line of vision, as shown in Figure 5A.

By way of contrast note Figure 5B wherein the manipulator is shown with the slave arm displaced laterally to the right by means of this invention. With the slave arm displaced in this manner the operator can manipulate the slave arm to an area generally to the right of the viewing window without himself leaving his normal position in front of the window. By virtue of the new lateral motion introduced by the means of this invention lateral reaching ability is greatly increased while maintaining full visibility of the operation without entailing the great expense which would otherwise be required if the window itself were to be enlarged.

Referring now to Figures 6 and 7 there is here shown a modified form of the lateral rotation means of this invention. According to the modified form of the invention the break 35 in the tubular horizontal support 10 must necessarily be made outside of the sleeve 14 and as a practical matter it would in virtually all instances be at the master arm end of the tubular support in order not to interfere with the removability of the entire manipulator from the shielding wall. As previously described, a ring bearing 37 is fitted into the horizontal tubular support at the break 35 so that slave arm portion 10B of the horizontal support is freely rotatable with respect to the master arm portion 10A of the support.

A slightly modified form of jack supporting arm 62A is securely mounted at 75 and 76 to the master arm end 10A of the tubular support. The supporting arm 62A is mounted closely adjacent to the break 35 in the tubular support and is provided with a slotted offset ear or lug 77 in which a suitable jack structure 60 may be pivotally mounted, as at 78. The ear 77 is displaced just sufficient that the center line of the slot lies in the same plane as the break 35 in the tubular support.

A somewhat modified form of curved counterweight arm 54A is securely mounted at 79 and 80 to the slave arm end 10B of the horizontal tubular support. The counterweight arm 54A is mounted directly on the slave arm portion of the tubular support and is mounted closely adjacent to the break 35 in the tubular member. The heavy counterweight 57 is supported at one end of the counterweight arm as previously described and the opposite end of the counterweight arm 54A is provided with an offset slotted ear or lug 81 adapted to receive the end of a jack piston 58 for pivotal mounting, as at 82. It will be seen from Figure 7 that the slots of members 77 and 81 lie in the same plane as the break 35. The jack structure and operation in this embodiment of the lateral rotation means is substantially the same as that heretofore described.

The simple manual jack shown may be replaced by a conventional electrical screw jack, hydraulic jack, mechanical jack, or the like as will be readily apparent to those skilled in the art.

As shown in Figure 6, the jack piston 58 is in a neutral position; that is, with the jack in this position the center lines of both the master arm and the slave arm lie in a single plane. When the piston 58 is retracted the counterweight 57 is moved clockwise to the right so as to rotate the slave arm end of the tubular support in a clockwise direction and move the center line of the slave arm to the left relative to the center line of the master arm. Conversely, when the piston is extended the counterweight is moved to the left and the slave arm end of the tubular support is moved in a counter-clockwise direction to alter the center line of the slave arm to the right relative to the center line of the master arm.

Since the radius of rotation in this form of the lateral rotation means is the same for both the counterweight arm 54A and the slave arm end 10B of the tubular support the degree of rotation is likewise the same so that a 10° counter-clockwise rotation of the counterweight arm results in a 10° counter-clockwise rotation of the slave arm. It will be readily apparent that the position of the jack may be changed to meet particular structural requirements so long as the positions of counterweights 57 and 70 are changed accordingly to maintain the manipulator device in balance.

As with the form of the invention shown in Figures 1, 3, 4 and 5, it will be seen that the modified lateral rotation device of Figures 6 and 7 likewise allows the slave arms of a manipulator to be displaced laterally relative to the position of the master arms. Because of this fact the range of maneuverability of the slave arms is similarly increased without requiring a comparable increase in the master arm operational area or viewing window area. Thus, the operator may remain before his viewing window and perform manipulations previously impossible because they were outside of his line of sight as shown in Figures 5A and 5B.

Broadly, the novelty of the invention resides in the utilization of the relative angular rotation to increase the range of maneuverability and usefulness of the manipulator and not in the specific means for introducing the relative rotation. The exemplary forms of the invention shown in the drawings and described in the specification are illustrative only.

After having been taught the broad concept of introducing relative rotation into the manipulator by applicants, other and obvious mechanical means for achieving relative rotation will be apparent to those skilled in the art. For example, relative rotation may be achieved by a simple gear system consisting of a large annular gear secured concentrically to the outside of the slave portion of the horizontal tube and having teeth meshing with the teeth of a small pinion gear mounted on a shaft journalled for rotation in bearings affixed to the master portion of the horizontal tube and driven by a suitably geared electric motor mounted on the master portion of the horizontal tube or equivalent means. The same result may be obtained by the use of a similar gear system utilizing a large internal ring gear affixed concentrically inside the slave arm portion of the horizontal tube and having teeth meshing with a suitably driven small pinion gear mounted on a shaft journalled for rotation in bearings affixed to the master arm portion of the horizontal tube.

Still another means by which relative rotation may be achieved consists of a planetary differential gear system comprising a pair of annular sun gears with different numbers of teeth fastened concentrically outside the master and slave portions, respectively, of the horizontal tube closely adjacent to the transverse cut, and a system of planetary pinion gears or clusters of planetary pinion gears each meshing simultaneously with both sun gears and free to rotate in an annular cage which in turn is supported in bearings permitting free rotation about the main horizontal tube axis. By means of an electric motor fastened to the master portion of the horizontal tube coupled by suitable gears, chains or belts to the planetary cage the desired relative rotation can be produced at a greatly reduced speed and with correspondingly increased torque.

Alternatively, a system of metal bands or cables may be anchored to and wrapped in opposite directions around the slave arm portion of the horizontal tube and led by suitable idler pulleys to a motor driven drum mounted on the master arm portion of the horizontal tube. The same result may also be achieved by means of a differential system comprising two sets of metal bands or cables anchored to and wrapped in opposite directions around both the master arm and slave arm portions, respectively, of the horizontal tube and led by suitable idler pulleys to two separate tubes mounted, in this instance, not on the manipulator itself but on some convenient location on the supporting wall structure and coupled to a motor driven gear differential or summing unit in such a way that rotation of the motor produces the desired relative rotation of the two portions of the horizontal tube completely independently of the normal manipulator motion in which the two portions rotate synchronously.

It is apparent, therefore, that many modifications and variations of this invention as hereinbefore set forth may be made without departing from the spirit and scope thereof. The specific embodiments described are given by way of example only and the invention is limited only by the terms of the appended claims.

We claim:

1. In a remote control manipulator comprising a horizontal tubular support, a master arm and a slave arm connected to the respective ends of said support for pivotal movement with respect to the support and link means interconnecting said arms for causing the arms to pivot conjointly with respect to the support, the improvement which consists in means for causing relative lateral rotation of said slave arm outside of the plane defined by the longitudinal axes of said tubular support and said master arm, said means including a two-part supporting structure, one part of which supports the slave arm and the other part of which supports the master arm, coupling means securing said slave arm and master arm portions of said supporting structure together while permitting rotational movement of one portion of said supporting structure relative to the other about a common axis, and means for producing and controlling the desired relative rotation of the two portions of the supporting structure.

2. In a remote control manipulator comprising a horizontal tubular support, a master arm and a slave arm connected to the respective ends of said support for pivotal movement with respect to the support and link means interconnecting said arms for causing the arms to pivot conjointly with respect to the support, the improvement which consists in means for causing relative lateral rotation between said slave arm and said master arm, said lateral rotation means comprising a two-part horizontal tubular support divided by a transverse peripheral cut into a slave arm portion and a master arm portion, a ring bearing in said support at said cut securing said master arm and slave arm portions together while permitting relative rotation thereof, and means for producing and controlling the desired relative rotation of the two portions of said divided tubular support without interference with the normal lateral motion of the manipulator in which the two portions of the manipulator are required to rotate together in exact synchronism and with a minimum of lost motion or deflection under load.

3. A manipulator according to claim 2 further characterized by a first supporting arm secured to said master arm portion of said horizontal support, a second supporting arm coupled to said slave arm portion of said horizontal support for rotation therewith, and means between said supporting arms for moving said arms relatively closer together and farther apart.

4. A manipulator according to claim 3 further characterized in that each of said supporting arms carries a balancing counterweight.

5. A manipulator according to claim 3 further characterized in that said means for moving said supporting arms comprises a jack including a jack housing having a piston movable therein, said jack housing being pivotally connected to one of said supporting arms and said piston being pivotally connected to other of said supporting arms.

6. A manipulator according to claim 5 further characterized in that said supporting arms and jack are so disposed that when said piston is in an intermediate position between full extended position and full retracted position the center lines of said master arm and said slave arm lie in a common plane.

7. A manipulator according to claim 3 further characterized in that said second supporting arm is connected to the slave arm portion of said horizontal tubular support by means of a torque rod journalled in the master arm portion of said horizontal tubular support for rotation, said supporting arm being secured to said torque rod adjacent to one end thereof for movement therewith, a crank arm secured to the opposite end of said torque rod for movement therewith and connected to the slave arm end of said horizontal tubular support to impart rotational movement of said torque rod thereto.

8. A manipulator according to claim 7 further characterized in that the master arm end of said horizontal tubular support is provided with a peripheral slot adjacent to the master arm end of said torque rod and said second supporting arm is provided with a projecting tongue extending through said slot and secured to said torque rod whereby movement of said supporting arm imparts rotation to said torque rod.

9. A manipulator according to claim 7 further characterized in that the slave arm end of said horizontal tubular support is provided with a bracket secured to its inner surface immediately adjacent to said ring bearing and said bracket is connected to the crank arm secured to the slave arm end of said torque bar by means of a link pivotally secured to said bracket and to said crank arm.

10. A remote control manipulator comprising a horizontal tubular support, a master arm and a slave arm connected to the respective ends of said support for pivotal movement with respect to the support, link means interconnecting said arms for causing the arms to pivot conjointly with respect to the support, said horizontal tubular support being divided into a slave arm portion and a master arm portion by means of a transverse peripheral cut, a ring bearing secured to the ends of said slave arm portion and master arm portion of said horizontal tubular support adjacent to said cut securing said portions together while permitting relative rotation thereof, offset connectors in said link means by-passing said ring bearing, a first supporting arm secured to said master arm portion of said horizontal support in a plane generally normal to the longitudinal axis of said support, a second supporting arm secured to said slave arm portion of said horizontal support for rotation therewith, said second supporting arm lying in a plane generally normal to the longitudinal axis of said support, and means external of said horizontal support between said supporting arms for imparting relative movement thereto.

11. A manipulator according to claim 10 further characterized in that said means for moving said supporting arms comprises a jack including a jack housing having a piston movable therein, said jack housing being pivotally connected to one of said supporting arms, said piston being pivotally connected to the other of said supporting arms, said jack being so disposed between said supporting arms that when said piston is in an intermediate position between full extended position and full retracted position the center lines of said master arm and said slave arm lie in a common plane.

12. A remote control manipulator comprising a horizontal tubular support, a master arm and a slave arm connected to the respective ends of said support for pivotal movement with respect to the support, link means interconnecting said arms for causing the arms to pivot conjointly with respect to the support, said horizontal tubular support being formed from two parts secured together by an internal ring bearing to permit relative rotation of the slave arm portion of said support with respect to the master arm portion of said support, a first supporting arm secured to said master arm portion of said horizontal support in a plane generally normal to the longitudinal axis of said support, a peripheral slot in said support lying in substantially the same plane as the first supporting arm, a torque rod journalled in the master arm portion of said horizontal tubular support for rotation, a second supporting arm having a projecting tongue extending through said slot and secured to said torque rod whereby movement of said second supporting arm imparts rotation to said torque rod, a crank arm secured to the opposite end of said torque rod for movement therewith, said crank arm being connected to the slave arm end of said horizontal tubular support to impart rotational movement of said torque rod thereto.

13. A manipulator according to claim 12 further characterized in that the slave arm end of said horizontal tubular support is provided with a bracket secured to its inner surface immediately adjacent to said ring bearing and said bracket is connected to the crank arm secured to the slave arm end of the torque bar by means of a link pivotally secured to said bracket and to said crank arm.

14. A remote control manipulator comprising a horizontal tubular support, a master arm and a slave arm connected to the respective ends of said support for pivotal movement with respect to the support, link means within said support interconnecting said arms for causing the arms to pivot conjointly with respect to the support, said horizontal tubular support being divided into a slave arm portion and a master arm portion having relative rotation and secured together by a ring bearing, a first supporting arm secured to said master arm portion of said horizontal support, said supporting arm lying in a plane generally normal to the longitudinal axis of said support, a second supporting arm secured to the slave arm portion of said horizontal support for rotation therewith, said second supporting arm lying in a plane generally normal to the longitudinal axis of the horizontal support, said supporting arms being secured respectively to said master arm portion and slave arm portion of said horizontal support closely adjacent to the plane of division between said slave arm portion and master arm portion of said horizontal tubular support and means substantially in said plane of division between and connected to said supporting arms for moving said arms relative to one another.

15. A manipulator according to claim 14 further characterized in that each of said supporting arms carries a balancing counterweight.

16. A manipulator according to claim 14 further characterized in that said means for moving said supporting arms comprises a jack including a jack housing having a piston movable therein, said jack housing being pivotally connected to one of said supporting arms, said piston being pivotally connected to the other of said supporting arms, said jack being so disposed between said supporting arms that when said piston is in an intermediate position between full extended position and full retracted position the center lines of said master arm and said slave arm lie in a common plane.

17. A remote control manipulator comprising a two-part horizontal supporting structure, a master arm connected to one of the parts of said supporting structure and a slave arm connected to the other part of said supporting structure for pivotal movement with respect to said supporting structure, link means interconnecting said master arm and slave arm for causing the arms to pivot conjointly with respect to the supporting structure, coupling means securing said slave arm and master arm portions of said supporting structure together while permitting rotational movement of one portion of said supporting structure relative to the other about a common axis, and means for producing and controlling the desired relative rotation of the two portions of the supporting structure whereby one arm may be caused to be rotated laterally outside of the plane defined by the longitudinal axes of the other arm and the horizontal supporting structure.

References Cited in the file of this patent
UNITED STATES PATENTS 2,771,199    Jelatis _____ Nov. 20, 1956